United States Patent [19]

Obata et al.

[11] 4,330,884
[45] May 18, 1982

[54] PICKUP ARM DEVICE

[75] Inventors: Shuichi Obata, Kyoto; Hiroshi Yasuda; Yukihiro Fukushima, both of Moriguchi, all of Japan

[73] Assignee: Matsushita Electric Industrial Co., Ltd., Osaka, Japan

[21] Appl. No.: 121,012

[22] Filed: Feb. 13, 1980

[30] Foreign Application Priority Data

Feb. 20, 1979 [JP] Japan .............................. 54-21393[U]
Feb. 20, 1979 [JP] Japan .............................. 54-21395[U]
Feb. 20, 1979 [JP] Japan .............................. 54-21396[U]

[51] Int. Cl.³ .............................................. G11B 3/10
[52] U.S. Cl. ................................................... 369/255
[58] Field of Search .......................... 274/23 R, 23 A; 369/255, 244

[56] References Cited

U.S. PATENT DOCUMENTS

4,203,606 5/1980 Obata et al. ...................... 274/23 R

Primary Examiner—Harry N. Haroian
Attorney, Agent, or Firm—Burgess, Ryan and Wayne

[57] ABSTRACT

A pickup arm device comprising a rotary bearing having a mounting bed rotatable about both the vertical and horizontal axes, and an arm assembly consisting of an arm, a cartridge mounting head shell at one end thereof, a rider weight at the other end thereof and a mount or saddle which is formed between the ends thereof and adapted to be slidably mounted on the mounting bed of the rotary bearing, whereby the arm assembly including a cartridge may be easily replaced.

9 Claims, 11 Drawing Figures

PICKUP ARM DEVICE

BACKGROUND OF THE INVENTION

The present invention relates to a pickup arm device.

The prior art pickup arm devices are in general provided with a locking nut or the like for permitting the replacement of a cartridge so that the reduction in overall effective mass of the arm is difficult and consequently the improvements of desired characteristics cannot be attained. In order to reduce the effective mass of the arm, there has been proposed an arm construction in which a head shell, upon which is removably mounted a cartridge, is formed integral with an arm at the leading end thereof and the other or base end of the arm is connected with a locking nut or the like to a rotary base or the like which is rotatable about both the vertical and horizontal axes. However, after a long period of operation a play is produced at the joint between the arm and rotary bearing so that the arm vibrates at a resonance frequency which adversely affects the faithful reproduction.

If an arm is formed integral with a rotary base in order to overcome the above-described problems, the replacement of the arm becomes almost impossible because various components of an automatic playing mechanism or the like are mounted on the axis of the rotary base.

SUMMARY OF THE INVENTION

One of the objects of the present invention is therefore to provide a pickup arm device having in general a rotary bearing including a mounting bed or the like which may rotate about both the vertical and horizontal axes, and an arm assembly consisting of an arm, a cartridge mounting head shell at one end thereof, a rider weight or the like at the other end thereof for adjusting the tracking or stylus pressure and a mount or saddle between the ends thereof adapted to be removably and slidably mounted on the mounting bed or the like of the rotary bearing. When the arm assembly is mounted on or removed from the rotary bearing, the output signal transmission line extended from a cartridge for transmitting the output therefrom may be automatically connected or disconnected from an associated exterior circuitry.

Another object of the present invention is to provide a cartridge arm device which may substantially overcome the problems encountered in the prior art cartridge arm devices.

A further object of the present invention is to provide a epoch-making pickup arm device which is very simple in construction so that the assembly may be much facilitated and the considerable reduction in fabrication cost may be attained, the whole arm assembly which has an arm and a weight and which may be optimumly matched with the compliance of a cartridge used being replaceable.

BRIEF DESCRIPTION OF THE DRAWINGS

FIG. 8 is a sectional view of the mount or saddle mounted on the mounting bed or the like;

Same reference numerals are used to designate similar parts throughout the figures.

DETAILED DESCRIPTION OF THE PRIOR ART

Figure 1:
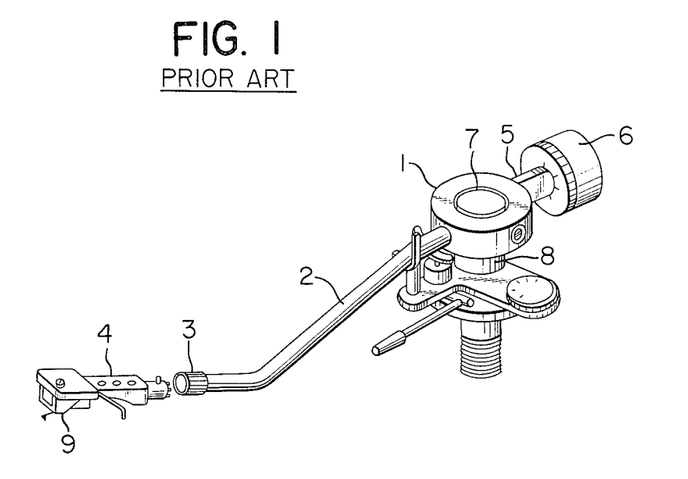
FIGS. 1 and 2 are perspective views, respectively, of prior art pickup devices.

Referring to FIG. 1, a prior art pickup arm device comprises in general an arm 2 having its base securely attached to a rotary base 1 and a head shell 4 which is attached with a lock nut 3 to the leading end of the arm 2 and on which is mounted a cartridge 9. A weight supporting shaft 5, which is made of a synthetic resin or the like, is extended from the rotary base 1 in the direction opposite to that of the arm 2 and a balance or rider weight 6 is axially slidably fitted over the shaft or shank 5. The rotary base 1 is mounted with a pivot bearing on a rotary shaft 7 for vertical swinging movement and the rotary shaft 7 is mounted on a base 1 for horizontal rotation. Therefore the arm 2 may be swung both in the horizontal and vertical directions.

The head shell 4 is removably attached to the leading end of the arm 2 with the locking nut 3 which is relatively heavy in weight. As a result, the attempt for improving the desired characteristics of the pickup arm device by reducing the weights of both the arm 2 and head shell 4 will not result in the reduction in effective overall weight of the pickup arm device, whereby the desired improvements cannot be attained. Furthermore the prior art pickup arm device of this type is disadvantageous in that the cost of the joint means such as the locking nut 3 increases the fabrication cost of the pickup arm device.

Figure 2:
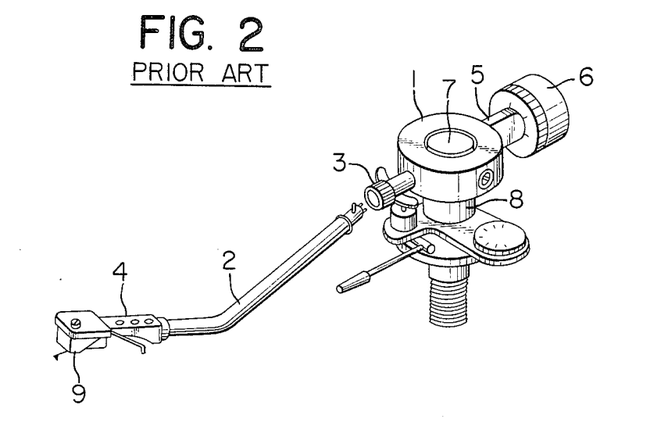

In order to solve the above and other defects, there has been proposed a pickup arm device of the type shown in FIG. 2. The head shell 4 is formed integral with the pickup arm 2 at the leading end thereof and the base end of the pickup arm 2 is joined with the locking nut 3 or the like to the rotary base 1. As a consequence, the adverse effect of the relatively heavy weight of the locking nut 3 or the like on the overall effective weight of the pickup arm device may be reduced to a minimum. This arrangement is also advantageous in that because of the integration of the pickup arm 2 and the head shell 4, the reduction in both the weight and cost may be easily attained. In addition, the pickup arm 2 itself may be removed readily from the rotary base 1 so that the desired improvements of various characteristics may be relatively easily attained by for instance, replacing a pickup arm made of aluminum alloy or the like with a pickup arm made of carbon fibers. However there arises a problem that after a long period of operation a play is produced in the joint between the arm 2 and the rotary base 1 so that the resonance occurs which adversely affects the desired reproduction characteristics.

In order to overcome the above and other problems, there may be proposed to securely attach the base end of the pickup arm 2 to the rotary base 1, thereby eliminating the locking nut or the like 3. However it is not permitted to replace only the cartridge 9. That is, the attempts to change or improve the reproduction characteristics by the replacements of the arm 2 and head shell 4 cannot be attained. In order to replace the arm 2 and head shell, it will become necessary therefore to remove the pickup arm device from the top plate of a cabinet. However in the case of the automatic player, various components of the automatic playing mechanism are associated with the rotary shaft 7 so that the replacement may become almost impossible.

DESCRIPTION OF THE PREFERRED EMBODIMENTS

First Embodiment, FIGS. 3-8

Figures 3, 4:
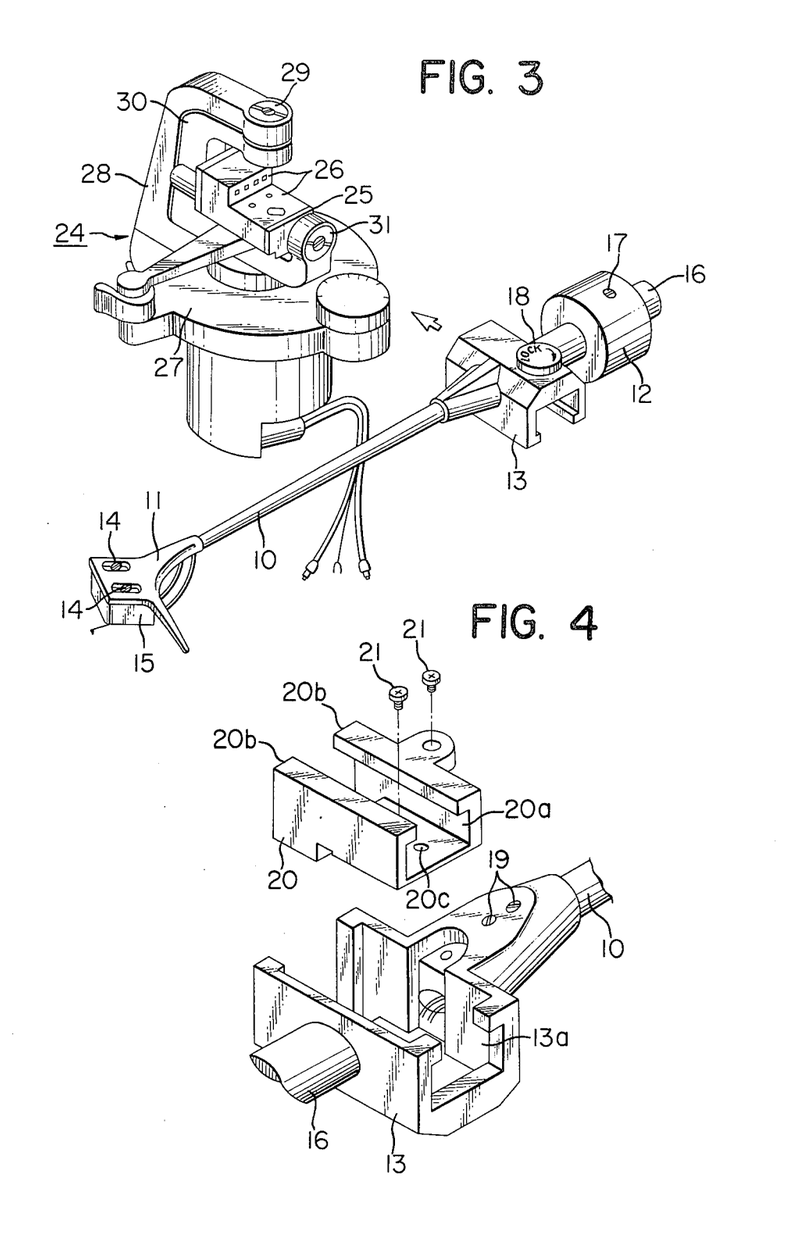
FIG. 3 is a perspective view of a first embodiment of a pickup arm device in accordance with the present invention.
FIG. 4 is an exploded perspective view of an arm assembly thereof showing a mount or saddle thereof and a plug mounted in the mount or saddle.

Referring first to FIG. 3, the first embodiment of a pickup arm device in accordance with the present invention includes an arm main body 10 having a cartridge mounting head shell 11 formed integral with the leading end thereof and a mount or saddle 13 formed integral with the base end thereof. A pickup cartridge 15 is mounted on the head shell 11 with screws 14. A weight supporting shaft 16 is extended from the mount 13 in the direction opposite to that of the arm main body 10 and a rider weight 12 is axially slidably mounted on the shaft 16. In order to move the rider weight 12, first a setting screw 17 is loosened and the rider weight 12 is moved to a desired position at which a desired stylus pressure may be attained. After the adjustment, the setting screw is tightened.

The mount 13 is extended perpendicular to the axis of the arm main body 10 and rider weight supporting shaft 16 which is considerably shorter than the arm main body 10. The mount or saddle 13 has a U-shaped cross sectional configuration so that it may be slidably mounted on a bed to be described below. When the mount or saddle 13 is mounted on the table, a locking nut or the like 18 is tightened so that the former may be securely held to the latter.

Referring next to FIG. 4, the base end of the arm main body 10 is fitted into a hollow shaft extended from the mount or saddle 13 and securely joined thereto with screws 19. A plug 20, which is made of a synthetic resin and is U-shaped in cross section, is fitted into a U-shaped recess 13a of the mount or saddle 13 and securely held in position with screws 21. The plug 20 has a U-shaped recess which is extended perpendicular to the axis of the arm main body 10 and mates with the mounting table. In order to ensure the secure engagement between them, the plug 20 is formed with inwardly extended flanges 20b extended along the side edges of the recess 20a. The plug 20 is further formed with a through hole 20c through which is extended the locking screw or the like 18 (See FIG. 3).

Figure 7:
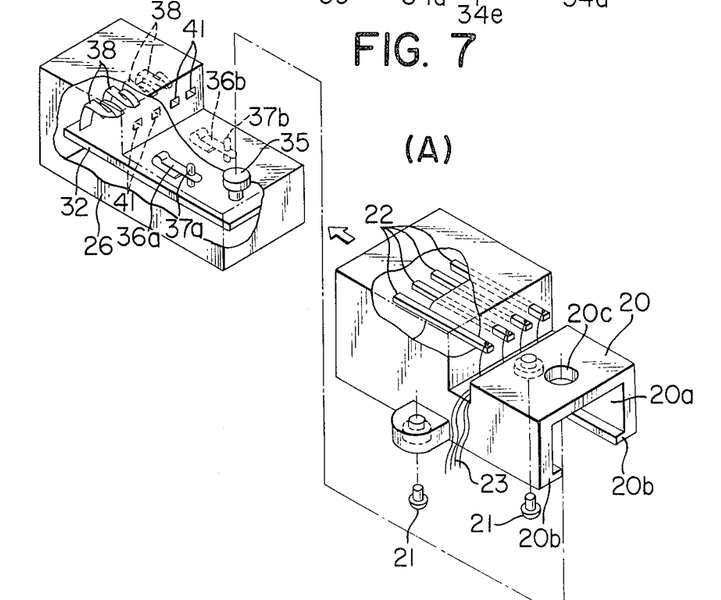
FIG. 7 is a perspective view of the assembled mount or saddle of the arm assembly and the assembled mounting bed or the like of the rotary bearing, illustrating the procedure of mounting of the former on the latter.

As best shown in FIG. 7 (See also FIG. 8), four connection terminals 22 are extended in the U-shaped recess 20a of the plug 20 longitudinally thereof and lead or output wires 23 extended from the pickup cartridge 15 through the arm main body 10 are connected to one ends, respectively, of the terminals 22.

Referring back to FIG. 3, the pickup arm device includes a rotary bearing which is indicated generally by the reference numeral 24 and upon which is mounted the mount or saddle 13 of the arm main body 10 including the head shell 11 and rider weight 12 as described in detail elsewhere in such a way that the arm main body 10 may be rotated about both the horizontal and vertical axes as will be described in detail below. The rotary bearing 24 has a first yoke 28 formed integral with a stationary base 27 and a second or inner yoke 30 pivoted with pivot pins 29 to the first yoke 28 for the rotation about a vertical axis. Mounted with pivot or bearing means 31 on the second yoke 30 is a mounting bed 25 which is U-shaped in cross section and upon which is mounted the mount or saddle 13 of the arm main body 10. The mounting bed 25 includes a socket 26 for electrical connection with the plug 20 of the mount or saddle 13.

Figure 5:
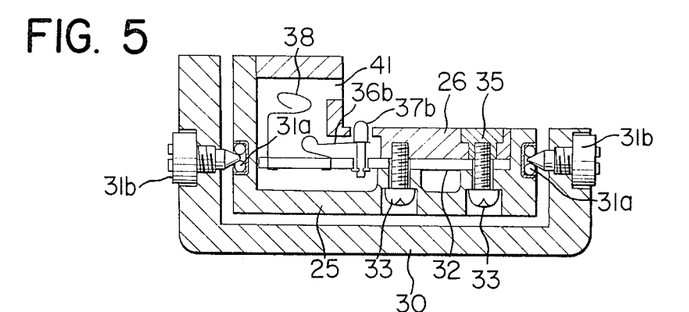
FIG. 5 is a fragmentary sectional view of a rotary bearing mainly illustrating a mounting bed or the like and a socket mounted thereon.

Referring to FIG. 5, the mounting bed 25 is mounted on the second yoke 30 with pivot pins or screws 31b whose pointed ends are received in pivot holes 31a of the mounting bed 25. The socket 26 which is so formed as to mate with the plug 20 of the mount or saddle 13 is mounted in the mounting bed 25 together with a printed circuit board 32 and securely held thereto with screws 33.

Figure 6:
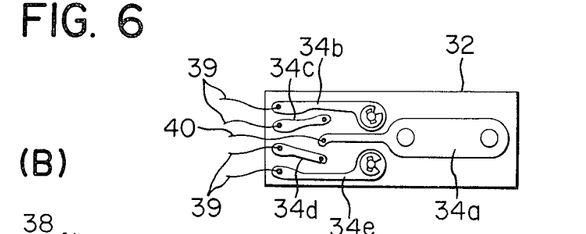
FIG. 6 is a schematic top view of a printed circuit board interposed between the mounting bed or the like and the socket shown in FIG. 5.

Referring also to FIG. 6, the construction of the printed circuit board 32 will be described. In has a grounding foil conductor 34a and signal transmission conductors 34b through 34e. When mounted, the grounding foil conductor 34a is made into electrical contact with the mounting bed 25 and with a block 35 mounted on the socket 26 through the screw 33 (See FIG. 5). One end of the signal conductors 34b and 34e are connected to movable contacts 37a and 37b which are biased under the forces of springs 36a and 36b in such a way that the upper ends of the movable contacts 37a and 37b may be extended beyond the upper surface of the socket 26. The springs 36a and 36b and movable contacts 37a and 37b constitute switches adapted to short-circuit the right and left signals from the pickup cartridge 15. The other ends of the signal conductors 34b through 34e are connected to four connection terminals 38 which in turn are connected to the connection terminals 22 of the plug 20. The signal conductors 34b through 34e are connected to lead wires 39 through which the signals from the pickup cartridge 15 are transmitted to an associated circuitry exterior of the rotary bearing 24. The grounding conductor 34a is connected to a lead wire 40 which in turn is grounded at any suitable point exterior of the rotary bearing 24.

Referring also to FIG. 7 again, connection terminal receiving or insertion holes 41 are formed through the end wall of the socket 26 which mates with the corresponding end wall of the plug 20, and the connection terminals 38 are disposed in opposed relationship with the holes 41 within the socket 26.

Figure 8:
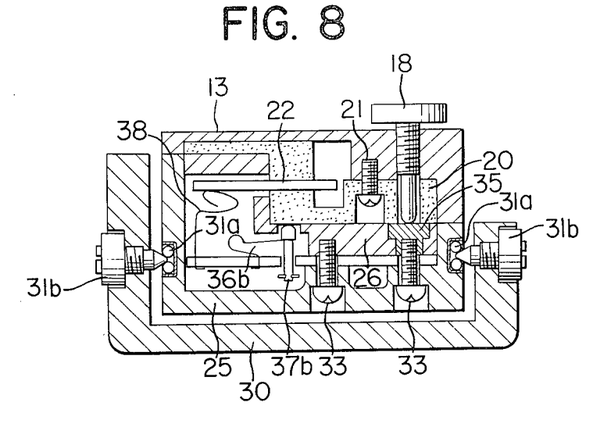

When the arm main body 10 is mounted on the rotary bearing 24, the mount or saddle 13 of the former is slidably fitted over the mounting bed 25 of the latter. That is, the mounting bed 25 is fitted into the recess 20a of the plug 20, which in turn is mounted on the mount or saddle 13, with the flanges 20b engaged with the undersurface or bottom of the mounting bed 20, whereby the arm main body 10 may be snugly fitted or mounted on the rotary bearing 24. Next the locking screw or the like 18 of the mount or saddle 13 is tightened, the point of the former being pressed against the block 35 on the socket 26 as best shown in FIG. 8, whereby the arm main body 10 may be securely mounted on the rotary bearing 24.

When the main body 10 is being mounted in the manner described above, the short-circuiting switches of the printed circuit board 32 prevent opening of the terminals 38 because of disconnection of the terminals 22 from the terminals 38. That is, the short-circuiting switches function before the terminals 22 become disconnected from the terminals 38 and shortcircuit the conductor 34b with the conductor 34c and the conductor 34d with 34e so that no hum is produced because of opening of the reproduction circuit on the input side. But when the arm main body 10 is completely mounted on the rotary bearing 24, the short-circuiting switches are opened so that the pickup cartridge 15 may be positively connected to the associated circuitry.

When mounted, the locking screw or the like 18 of the mount or saddle 10 is firmly pressed against the block 35 on the socket so that static electricity generated on the arm main body 10 and rotary bearing 24 is grounded through the grounding lead wire 40, whereby adverse effects on signal reproduction may be avoided.

As described elsewhere, the rider weight 12 may be axially movable along the supporting shaft 16 by a limited distance in order to compensate for the variation in weight of cartridges. It is therefore recommended to mount a cartridge of one type on one type of arm main body 10 having a rider weight 12 having the weight optimumly matched with the cartridge used and when the replacement of a cartridge is desired, to replace the arm main body 10 together with the rider weight 12 and the cartridge 15 with another arm main body with a suitable rider weight and a desired cartridge.

Figure 9:
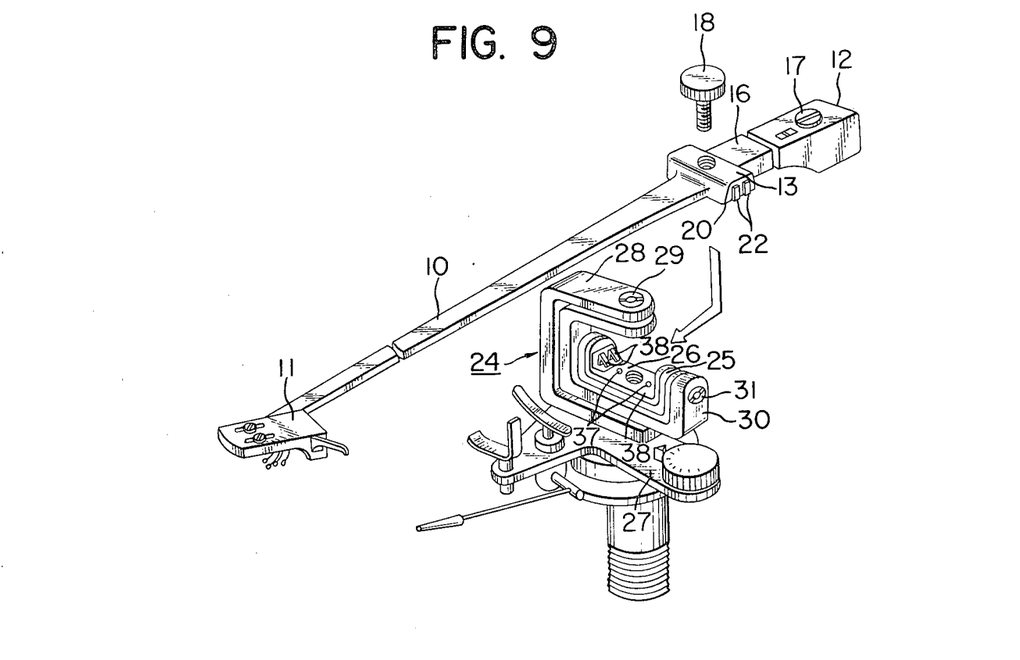
FIG. 9 is a perspective view of a second embodiment of the present invention.

Second Embodiment, FIG. 9

The second embodiment shown in FIG. 9 is substantially similar in construction to the first embodiment described above in detail with reference to FIGS. 3 through 8 except the mounting arrangement of the arm main body 10 on the rotary bearing 24. That is, while in the first embodiment the mount or saddle 13 of the arm main body 10 is slidably fitted over the mounting bed 25 of the rotary bearing 24, in the second embodiment the mount or saddle 13 is fitted over the mounting bed 25 from the above and is securely joined thereto with the locking screw or the like 18.

Instead of inserting the mounting bed 25 of the rotary bearing 24 into the plug 20 which in turn is mounted on the mount or saddle 13 of the arm main body 10, the former may be directly inserted into the mount or saddle 13 so that the plug 20 and socket 26 may establish only the electrical contact therebetween.

In summary, according to the present invention, one arm main body 10 including a rider weight and a cartridge 15 may be replaced with another main body 10 including a rider weight and a cartridge 15. In other words, it is now possible to replace one arm main body 10 together with a cartridge 15 with another arm main body 10 having another type cartridge 15. Therefore any desired cartridge optimumly matched with the arm main body may be used. In addition, when the mount or saddle 13 of the arm main body 10 is slidably fitted over the mounting bed of the rotary bearing 24, the plug 20 mounted on the former is automatically made into physical and electrical contact with the socket 26 mounted on the rotary bearing 24. This physical engagement between the plug 20 and socket 26 ensures the positive initial or temporary mounting of the arm main body 10 on the rotary bearing before the locking screw or the like 18 is firmly tightened so as to securely hold the arm main body 10 on the rotary bearing 24. Thus the mounting may be much facilitated and the correct mounting may be ensured. In addition, the head shell connectors used in the prior art pickup arm devices may be eliminated so that the pickup arm devices of the present invention may be made light in weight and may be fabricated at low costs. Moreover the generation of resonance may be avoided which adversely affects the reproduction characteristics. Furthermore, since the whole pickup arm assembly or structure consisting of the arm, the rider weight and the cartridge may be replaced, the materials and colors of the pickup arm assemblies or structures used may be changed very freely.

Furthermore when the arm assembly or structure is completely mounted on the rotary bearing, both are completely grounded so that adverse effects on the reproduction due to static electricity accumulated during the replacement or mounting is eliminated.

Figure 10:
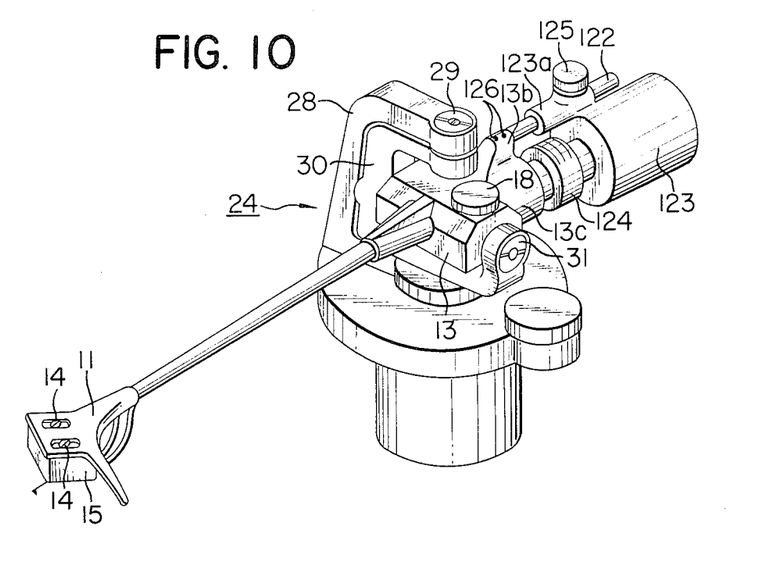
FIG. 10 is a perspective view of a third embodiment of the present invention.
Figure 11:
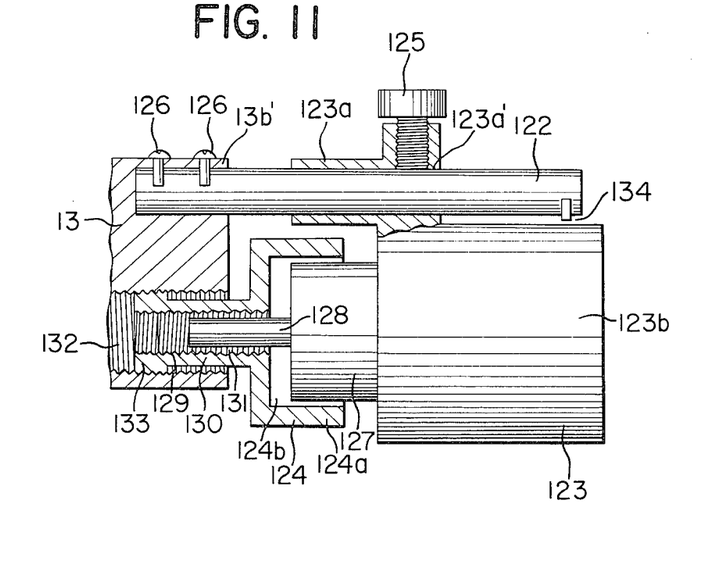
FIG. 11 is a fragmentary sectional view thereof illustrating a tracking or stylus pressure adjustment mechanism.

Third Embodiment, FIGS. 10 and 11

The third embodiment to be described below with reference to FIGS. 10 and 11 is substantially similar in construction except the construction of a balance weight adjustment mechanism. The balance adjusting mechanism in general comprises a balance weight 123, an adjusting knob 124 and a guide rod 122.

The balance weight 123 consists of a main body 123b, a projection 127 which is extended from one end face of the main body 123b coaxially thereof and whose diameter is smaller than that of the main body 123b, a stem 128 extended from the projection 127 coaxially thereof and a left-handed screw thread portion 129 at the leading end of the stem 128. The balance weight 123 further includes a guide 123a having a cylindrical guide hole 123a' which is extended through the guide 123a in parallel with the axis of the balance weight 123. The guide 123a is slidably fitted over the guide rod 122 extended from the mount or saddle 13 in parallel with the axis of the balance weight 123. One end of the guide rod 122 is fitted into a guide rod receiving hole 13b' drilled or otherwise formed in the mount or saddle 13 and is securely held in position with setting screws 126. The guide 123a includes a locking screw 125 threadably fitted therein for engagement with the guide rod 122 so as to securely hold the balance weight 123 at a desired position as will be described in detail below.

The adjusting knob 124 consists of a main body 124a having a cylindrical bore 124b whose diameter is greater than that of the projection 127 of the balance weight 123 so that the projection 127 may be moved into or out from the cylindrical bore 124b. The adjusting knob 124 further includes a hollow stem 130 extended from the main body 124a coaxially thereof and formed at the leading end thereof with a right-handed screw thread portion 133 whose diameter is slightly greater than the stem portion 130. The through axial hole of the stem portion 130 is internally threaded (left-handed) as indicated by 131 for engagement with the left-handed screw thread portion 129 of the stem 128 of the balance weight 123. The right-handed screw thread portion 133 of the adjusting knob 124 is engaged with an internally threaded right-handed screw hole 132 formed in the mount or saddle 13.

A stop 134 is extended from the guide rod 122 adjacent to the free end thereof so that the guide 123a may engage with it and be prevented from moving off the guide rod 122.

When the adjusting knob 124 is rotated, it is displaced forwardly or backwardly depending upon the direction or rotation thereof and consequently the balance weight 123 is displaced backwardly or forwardly of the adjusting knob 124 along the guide rod 122 when the locking screw 125 is loosened. In this case the rotation of the adjusting knob 124 is transmitted to the balance weight 123, but the engagement of the guide 123a with the guide rod 122 may prevent the rotation of the balance weight 123. Thus only the translational or axial movement of the balance weight 123 may be permitted. The locking screw 125 is always maintained in an upright position so that tightening or loosening of the locking screw 125 is easily made.

The balance adjustment mechanism of the present invention is further advantageous in that because of the screw connection between the adjusting knob 124 and the balance weight 123 extremely fine displacement of the balance weight 123 becomes possible and extremely fine tracking pressure adjustment attained.

The balance adjustment mechanism may be so modified that the adjusting knob 124 is attached to the mount or saddle 13 in such a way that the rotation of the adjusting knob 124 is permitted but the axial movement thereof may be prevented. The balance weight 123 is threadably connected to the adjusting knob 124 which is disposed as is the case of the third embodiment.

In summary, according to the third embodiment of the present invention, extremely fine axial displacement of the balance weight 123 and consequently extremely fine adjustment of the tracking or stylus pressure may be effected by rotating the adjusting knob 124. In addition, the locking screw 125 may be maintained in the upright position regardless of the rotation of the adjusting knob 124, whereby operation or tightening and loosening of the locking screw 125 can be done easily.

What is claimed is:

1. A pickup arm device which comprises
   (a) a rotary bearing having a mounting bed rotatable about the horizontal and vertical axis mounted thereon;
   (b) an arm assembly having adjacent one end thereof a cartridge mounting head shell, and adjacent the other end thereof a balancing weight assembly and a mounting means between the ends thereof which is adapted to be removably engaged with the mounting bed of said rotary bearing,
   (c) a first connecting member mounted on said mounting means of said arm assembly and provided with connection terminals which are electrically connected to the output lines from a cartridge and are extended in the direction in which the mounting means of said arm assembly is engaged with the mounting bed of said rotary bearing;
   (d) a second connecting member adapted to engage said first connecting member, said second connecting member being mounted on said mounting bed of said rotary bearing and formed with insertion holes into which said connection terminals of said first connecting member extend when said mounting means of said arm assembly is mounted on said mounting bed of said rotary bearing, said second connecting member having internal terminals adjacent said insertion holes for making electrical connection with said connection terminals of said first connecting member when the latter are extended through said insertion holes of said second connection member; and
   (e) a locking means threadably fitted through said mounting means of said arm assembly for selective engagement with said mounting bed of said rotary bearing;
   whereby when said arm assembly is mounted on said mounting bed of said rotary bearing, the electrical connection between said first and second connecting means may be established, and said arm assembly can be securely held to said rotary bearing.

2. A pickup arm device as set forth in claim 1 wherein said balancing weight assembly mounted on said arm assembly is axially movable so that the tracking or stylus pressure may be adjustable.

3. A pickup arm device as set forth in claim 1 wherein said first connecting member is arranged so that said member may be engaged with said mounting bed of said rotary bearing when said arm assembly is mounted on said rotary bearing.

4. The pickup arm device according to claim 1, wherein said internal terminals of said second connecting member comprise a first pair of terminals for connection to a first output channel of said cartridge, and a second pair of terminals for connection to a second output channel thereof, said second connecting member further including a first short-circuiting switch for interconnecting the terminals of said first pair, a second short-circuiting switch for interconnecting the terminals of said second pair, and actuating means extending toward and engagable by said first connecting member for operating said switches only when said internal terminals of said second connecting member are electrically connected to said connection terminals of said first connecting member and not fully engaged therewith, whereby said switches short-circuit said terminal pairs to prevent the generation of noise during insertion and removal of said cartridge.

5. A pickup arm device comprising:
   a rotary bearing having a mounting bed rotatable about horizontal and vertical axes mounted thereon;
   an arm assembly having a cartridge mounting head shell adjacent one end thereof; a balancing weight assembly adjacent the other end thereof, and a mounting means between the ends thereof, said mounting means being adapted to be removably engaged with the mounting bed of said rotary bearing,
   said balancing weight assembly being mounted on said arm assembly and being axially movable so that the tracking or stylus pressure may be adjusted,
   said balancing weight assembly comprising:
   a tone arm main body engaged with a rotary bearing having a rotatable base,
   a tracking or stylus pressure adjusting knob rotatably engaged with said rotary base,
   a weight guide shaft connected to said rotary base parallel to said tracking or stylus pressure adjusting knob, and a balance weight, slidably mounted on said weight guide shaft and connected to the rear position of said rotary base through said tracking or stylus pressure adjusting knob, whereby upon rotation of said tracking or stylus pressure adjusting knob said balance weight may be displaced forwardly or backwardly along said weight guide shaft with respect to said rotary base;

a first connecting member mounted on said mounting means of said arm assembly and provided with connection terminals adapted to be electrically connected to the output lines from a cartridge, said connection terminals being extended in the direction in which the mounting means of said arm assembly is engaged with the mounting bed of said rotary bearing;

a second connecting member mounted on said mounting bed of said rotary bearing and formed with insertion holes into which said connection terminals of said first connecting member extend when said mounting means of said arm assembly is mounted on said mounting bed of said rotary bearing, said second connecting member making electrical connection with said connection terminals of said first connecting member when the latter extend into said insertion holes of said second connecting member; and a locking means threadably fitted through said mounting means of said arm assembly for selective engagement with said mounting bed of said rotary bearing;

whereby when said arm assembly is mounted on said mounting bed of said rotary bearing, the electrical connection between said first and second connecting means may be established, and said arm assembly can be securely held to said rotary bearing.

6. A pickup arm device as set forth in claim 5 further comprising locking means mounted on said balance weight which securely holds said balance weight at a desired position by engaging said weight guide rod.

7. A pickup arm device as set forth in claim 5 wherein said tracking or stylus pressure adjusting knob is threadably connected to said rotary base.

8. A pickup arm device as set forth in claim 5 wherein said balance weight is threadably connected to said tracking or stylus pressure adjusting knob.

9. A pickup arm device comprising:

a rotary bearing having a rotatable mounted bed;

an arm assembly having a cartridge mounting head shell at one end thereof, a balance weight at the other end thereof, and a mounting means between said ends for detachably engaging said mounting bed of said rotary bearing;

a first connecting member secured to said mounting means and having a pair of connection terminals extending therefrom, said terminals being adapted to be connected to output lines of a pickup cartridge disposed within said cartridge mounting head shell;

a second connecting member secured to said mounting bed of said rotary bearing and having at least two insertion holes for receiving said connection terminals, said second connecting member having a pair of internal terminals adjacent said insertion holes for electrically engaging said connection terminals of said first connecting member;

said second connecting member further including a shortcircuiting switch interconnecting said internal terminals, and actuating means extending toward and engageable by said first connecting member for operating said switch only when said internal terminals of said second connecting member are electrically connected to said connection terminals of said first connecting member and not fully engaged therewith, whereby said switch short-circuits said internal terminal pair to prevent the generation of noise during insertion and removal of said cartridge.

* * * * *

UNITED STATES PATENT AND TRADEMARK OFFICE
CERTIFICATE OF CORRECTION

PATENT NO. : 4,330,884
DATED : May 18, 1982
INVENTOR(S) : Shuichi Obata, et al

It is certified that error appears in the above—identified patent and that said Letters Patent is hereby corrected as shown below:

Column 7, line 26: before "attained" insert --may be--

Signed and Sealed this

Seventh Day of June 1983

[SEAL]

Attest:

DONALD J. QUIGG

Attesting Officer

Acting Commissioner of Patents and Trademarks